UNITED STATES PATENT OFFICE.

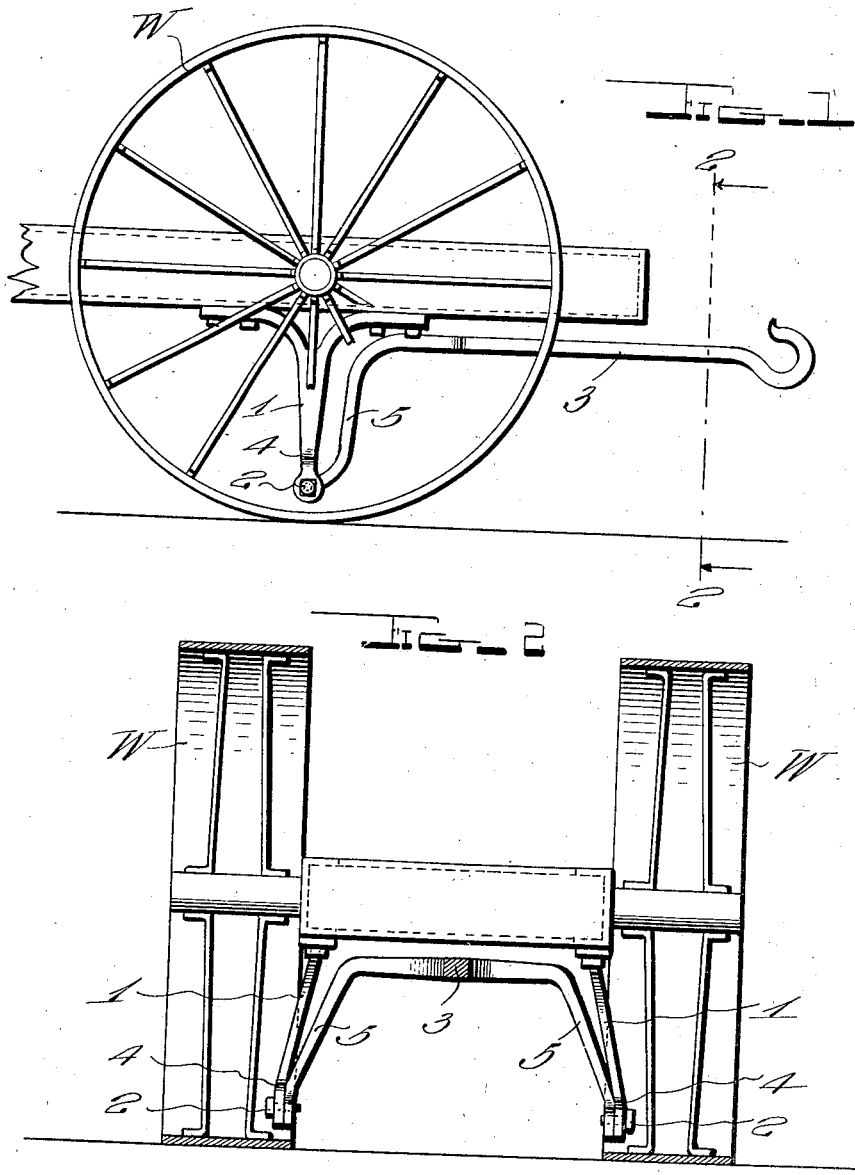

JOHN J. BUKOLT, OF STEVENS POINT, WISCONSIN.

DRAWBAR FOR TRACTORS.

1,378,005.         Specification of Letters Patent.         Patented May 17, 1921.

Application filed August 16, 1920. Serial No. 403,668.

*To all whom it may concern:*

Be it known that I, JOHN J. BUKOLT, a citizen of the United States, residing at Stevens Point, in the county of Portage and State of Wisconsin, have invented certain new and useful Improvements in Drawbars for Tractors; and I do declare the following to be a full, clear, and exact description of the invention, such as will enable others skilled in the art to which it appertains to make and use the same.

This invention relates to improvements in draw-bars for tractors, and it consists more particularly in a novel way of mounting the draw-bar.

Devices of this character in use at the present time, are, in the most of instances, so connected with the tractor that the point of connection is in a line with the hub or shaft of the drive wheels or frame of the body to which it is connected. This is not an entirely practical and effective way for connecting the draw-bar since it has a tendency to raise up the front of the tractor when heavy loads are being pulled. Due to this tendency, the tractor is oftentimes caused to turn backward and completely over. In cases where the drive wheels are in front and the steering wheel at the rear, the draw-bar being connected to the above mentioned points has a tendency to cause the steering wheel to sink down in the soft ground over which it is being pulled. Inasmuch as there is already a great amount of weight on the rear end of the tractor and an additional downward pull caused by the draw-bar, the steering wheel sinks farther into the ground than under ordinary circumstances. In this way, the front of the tractor is raised just enough to cause the drive wheels to slip and not obtain the proper traction. These circumstances are disadvantageous and can be overcome.

In support of the above statement, it is my intention and the object of this invention to so connect the draw-bar with the tractor frame that the point of connection is as close to the ground as is possible, thus the line of draft is so positioned that the above circumstances are entirely overcome.

Other objects and advantages of the invention will be apparent during the course of the following description.

In the accompanying drawings forming a part of this specification and in which like numerals are employed to designate like parts throughout the same:

Figure 1 is a side elevation of a portion of a tractor showing my improved drawbar and the manner in which it is connected thereto.

Fig. 2 is a sectional view however taken on the line 2—2 of Fig. 1, looking in the direction of the arrows.

Since my idea may be carried out in many different ways, I do not desire to limit myself to any particular construction and arrangement of parts. However, by preference I employ a pair of brackets 1 which are connected to the tractor frame F, in most instances, at the rear end where the drive wheels W are located. Pivotally connected at its inner end as indicated at 2, is the draw-bar 3 to which the trailer or other device is connected. As above stated the draw-bar in most cases is so connected that the point of pivot or draft is in a line with the tractor frame and causes over-turning of the tractor. With my construction it is to be noted that the brackets extend downwardly to a point in close proximity to the ground and it is at this point that I connect the draw-bar. By having the point of connection nearer the ground, I find it well to provide means for preventing obstructions coming into engagement with the draw-bar and its connecting bracket. To this end, I offset the lower ends of the bracket as indicated at 4 so that when they are in position, the lower ends will extend into the circumference of the wheels. In this way, obstructions will be prevented from striking the draw-bar. In order to adapt the draw-bar for connection to the brackets 1, I provide it at its inner end with a fork 5 which is directed downwardly to permit it to be connected in the manner shown and at the same time to permit it to straddle the row over which the tractor is pulled. The employment of the brackets 1 is not altogether necessary in all instances since in some cases, the tractor frame will be provided with a depending portion forming the equivalent of the bracket and providing the necessary means for positioning the point of connection of the draw-bar close to the ground.

From the foregoing description it will be seen that I have devised a novel way of preventing, to a great extent, backward over-turning of the tractor by disposing the point of connection of the draw-bar with the tractor at a point close to the ground. By providing the draw-bar with the laterally downwardly directed end, it is permitted to be connected in the above described manner and it is also permitted to straddle the row. Furthermore, this laterally downward turned end positions the hook end of the draw-bar in the proper plane for connection of the trailer.

A careful consideration of the foregoing description taken in connection with the accompanying drawings will enable persons skilled in the art to which this invention relates to obtain a clear understanding of the same. Further description is deemed unnecessary.

Since probably the best results can be obtained with the construction shown and described, this construction is taken as a preferred form of the invention. However, I wish it to be understood that various minor changes in the shape, size, and arrangement of parts and manner of connecting the draw-bar may be resorted to without departing from the spirit of the invention or the scope of the subjoined claims.

I claim:

1. The combination with a tractor frame including depending portions and wheels; of a draw-bar connected to said portions on opposite sides of the longitudinal center of the same, the points of connection being close to the ground and within the space circumscribed by the rim of the wheels.

2. The combination with a tractor frame including depending portions extending down into close proximity to the ground, of a draw-bar having a forked inner end pivotally connected to said depending portions.

3. The combination with a wheel-supported tractor frame including depending portions; of a draw-bar having a forked inner end pivoted to said depending portions, the points of pivot being close to the ground and within the space circumscribed by the rim of the wheels.

4. The combination with a tractor frame; of a pair of brackets connected to and depending from said frame, the lower ends thereof extending into close proximity to the ground, and a draw-bar pivotally connected at its inner end to the lower ends of said brackets.

5. The combination with a wheel-supported tractor frame; of a pair of brackets connected thereto and extending downwardly close to the ground and into the space circumscribed by the rim of the wheels, and a draw-bar having a laterally and downwardly directed forked inner end pivotally connected to the lower ends of said brackets.

In testimony whereof I have hereunto set my hand.

JOHN J. BUKOLT.